(No Model.)  
2 Sheets—Sheet 1.
C. L. PARKER.
ANIMAL TRAP.
No. 563,682. Patented July 7, 1896.
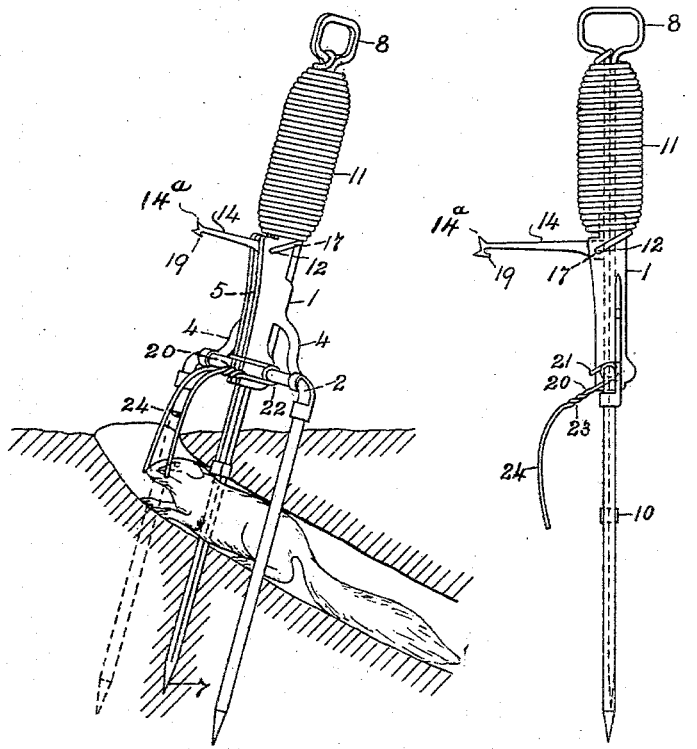
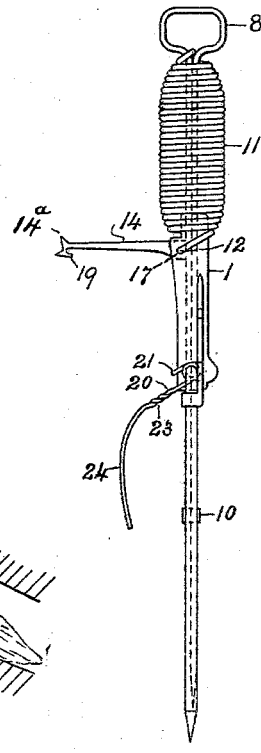
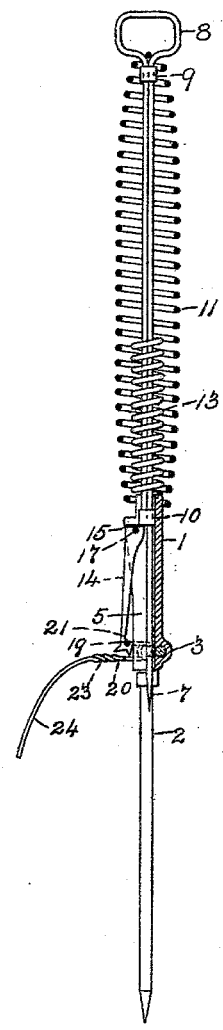
Fig. I.   Fig. II.   Fig. III.
WITNESSES  
Henry E. Brett  
Jas. W. White
INVENTOR  
C L Parker  
BY Dwight Bros.  
ATTORNEYS.

(No Model.) 2 Sheets—Sheet 2.
C. L. PARKER.
ANIMAL TRAP.
No. 563,682. Patented July 7, 1896.
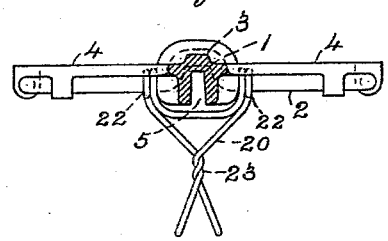
Fig. V.
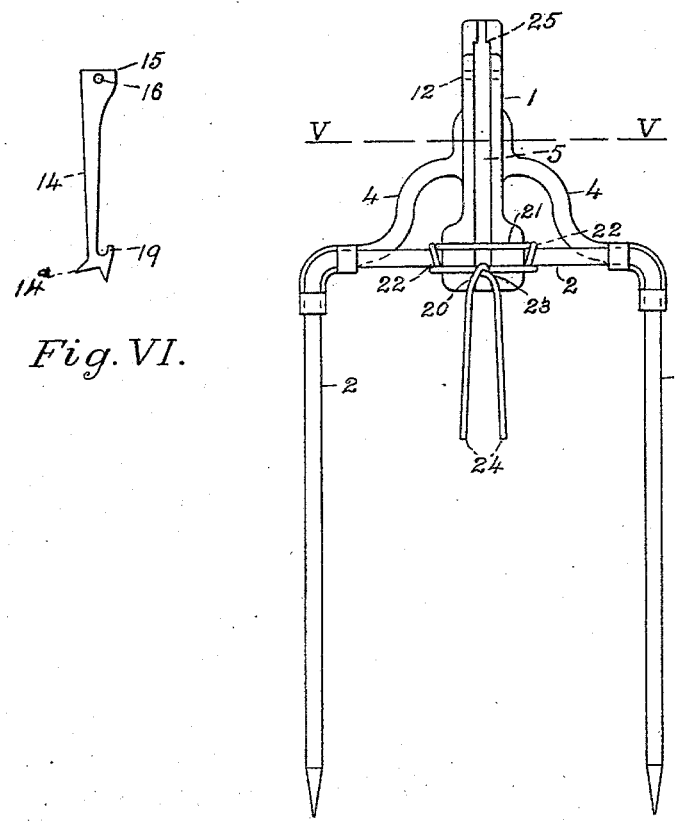
Fig. VI.
Fig. VII.
Fig. IV.
WITNESSES
Henry E. Brett
Jas. W. White
INVENTOR
C. L. Parker
BY Knight Bros.
ATTORNEYS.

UNITED STATES PATENT OFFICE.

CLARENCE L. PARKER, OF LOS ANGELES, CALIFORNIA.

ANIMAL-TRAP.

SPECIFICATION forming part of Letters Patent No. 563,682, dated July 7, 1896.

Application filed October 3, 1895. Serial No. 564,537. (No model.)

*To all whom it may concern:*

Be it known that I, CLARENCE L. PARKER, of Los Angeles, in the county of Los Angeles and State of California, have invented certain new and useful Improvements in Animal-Traps, of which the following is a full, clear, and exact description, reference being had to the accompanying drawings, which form a part of this specification.

My invention relates to improvements in animal-traps; and my invention consists in certain features of novelty hereinafter described and claimed.

Figure I is a perspective view showing the position of trap when it has been sprung and the animal caught. Fig. II represents a side elevation showing trap sprung. Fig. III is a longitudinal section showing trap set. Fig. IV represents a front elevation of the stock and fork secured thereto. Fig. V is a transverse section taken on line V V, Fig. IV. Fig. VI represents a side elevation of the lever for setting the trap. Fig. VII represents a side elevation of the lance or spear by which the animal is transfixed.

Referring to the drawings, 1 represents the stock or body, preferably cast of brass or other suitable metal.

2 represents a two-pronged U-shaped fork, the fork being connected to the stock by having the lower end of the stock cast upon a yoke 3 of the fork, the stock also having arms 4 extending to the upper ends of the prongs, to which they are suitably secured. The stock is provided with a central longitudinal groove 5, in which the spear 6 loosely fits. The spear 6 is preferably formed of a single piece of steel wire doubled upon itself for the major portion of its length. The point 7 of the spear and that portion adjacent to it which is designed to transfix and kill the animal is formed of a single section. In doubling the wire to form the spear I form a loop 8, which serves as a handle, and I connect the two wires immediately beneath the loop by a ferrule 9, and at the lower end of the double portion I connect the two wires by an additional ferrule 10.

11 represents the actuating coil-spring surrounding the spear-shaft and having its lower end passed through and secured to the upper end of the stock, as shown at 12, the opposite end of said spring being secured to the loop 8 at the outer end of the spear.

13 represents a short coil-spring placed loosely around the spear-shaft and within the spring 11, the spring 13 serving as a buffer for the spear-shaft when the trap has been sprung, the lower end of the spring 13 resting on the upper end of the stock when the trap is set or in an upright position.

14 represents the lever for setting the trap, said lever having a square heel 15 and an orifice 16, the lever being pivoted by its heel in the groove 5 of the stock by having an extension 17 of the spring 11 passing through the stock at 12 and through the orifice 16 of the lever 14. The opposite end of the lever 14 is provided with a hook 19 for engaging the trigger 20. The trigger 20 is preferably made of a single piece of wire having a section 21 extending over the groove 5 of the stock and at right angles thereto, the wire then being loosely coiled at 22 around the fork on each side of the stock, the two ends of the wire being then brought together and twisted about each other at 23, the free ends of the wire then being forked and curved, as shown at 24, and extending some distance beyond and in advance of the lower end of the stock.

14$^a$ represents a point on the lower end of the setting-lever which prevents the section 21 of the trigger from being passed over the lever, and at the same time prevents the lever from being forced down until the spear has been drawn back to its proper position for setting.

The trap is set by holding the stock in one hand and drawing outward on the loop 8 of the spear, thus expanding the spring 11, as shown in Fig. III, the point of the spear remaining nearly on a line with the lower end of the stock when it is in its set position. As the ferrule 10 passes to the rear of the heel 15 of the lever 14, said lever falls forward from the position shown in Fig. I to the position shown in Fig. III, at which time the heel 15 of the lever 14 engages the ferrule 10 of the spear. Then by pressing down upon the lever with one finger of the hand which is holding the stock the spear can be held in its outward position by the lever, thus leaving the hand that drew the spear outward free to set the trigger, which is done by raising up upon the same and passing the section 21 of the trigger beneath the hook 19 of the lever. (See Fig. III.) As the animal comes in contact with the fork 24 of the trigger and presses it outward the section 21 is thrown out of engagement with the hook 19, permitting the lever 14 to fly outward, thus releasing the spear, which is instantly thrust forward by the contracting of the spring 11, thus transfixing and immediately killing the animal. The spear is limited in its outward movement by the ferrule 10 coming in contact with shoulders 25, located in the groove 5 near the outer end of the stock 1.

Where the trap is set in the ground, the prongs of the fork 2 are thrust down on each side of the hole, (see Fig. I,) the point of the spear when the trap is set being above the upper wall of the hole, and the fork 24 of the trigger extending into the path of the hole. The prongs of the trigger being made of wire are easily adjusted by being bent, as circumstances may require. I have shown my trap as set in the ground, but it is obvious that it will work anywhere when properly supported and located in the path of an animal.

I claim as my invention—

1. In an animal-trap the combination of a fork having a central yoke, a stock cast on the yoke, having a longitudinal open-faced slot, a spear operating in the stock, a spring for actuating the spear, a setting-lever, and a trigger adapted to engage the setting-lever, substantially as set forth.

2. In an animal-trap the combination of a fork, a grooved stock cast thereon, a spear adapted to operate in the grooved stock, an actuating-spring, a setting-lever pivoted to the stock and adapted to engage the spear, and a flexible trigger movably secured to the fork and adapted to engage the setting-lever, substantially as set forth.

3. In an animal-trap the combination of a fork, a cast stock having connection with the center of the fork and bracing-arms connecting with the prongs of the fork, a spear, a setting-lever, and a trigger adapted to engage the setting-lever, substantially as set forth.

4. In an animal-trap the combination of a fork, a stock secured to the fork a spear adapted to operate in the fork, a coil-spring surrounding the shaft of the spear for actuating the same and a buffer-spring located inside of the actuating-spring and surrounding the spear-shaft, substantially as set forth.

5. In an animal-trap, the combination of a fork, a stock secured to said fork, the spring-projected spear mounted on said stock, a setting-lever pivoted to the stock and formed at its outer end with a hook 19 and the point $14^a$; said point $14^a$ being located to prevent the lever being pressed down until the spear has been set substantially as explained.

6. As a new article of manufacture, a spear for an animal-trap formed of a single piece of metal, a portion of the same being doubled upon itself and secured to the main portion in close contact therewith, a point at one end and a loop at the opposite end, substantially as set forth.

CLARENCE L. PARKER.

Witnesses:
JAS. E. KNIGHT,
E. W. LITTLE.